United States Patent [19]

Wojtech et al.

[11] Patent Number: 5,073,622
[45] Date of Patent: Dec. 17, 1991

[54] PROCESS FOR THE PREPARATION OF NOVOLAK RESINS WITH LOW METAL ION CONTENT

[75] Inventors: Bernhard Wojtech, Bad Soden am Taunus; Walter Niederstaetter, Eltville; Horst-Dieter Thamm, Eschborn, all of Fed. Rep. of Germany

[73] Assignee: Hoechst Aktiengesellschaft, Frankfurt am Main, Fed. Rep. of Germany

[21] Appl. No.: 550,692

[22] Filed: Jul. 10, 1990

[30] Foreign Application Priority Data

Jul. 15, 1989 [DE] Fed. Rep. of Germany ....... 3923426

[51] Int. Cl.$^5$ ............................ C08F 6/00; C08G 3/00
[52] U.S. Cl. ..................................... 528/486; 528/129; 528/165; 528/487; 528/490; 528/499
[58] Field of Search ............... 528/165, 486, 487, 490, 528/499, 129

[56] References Cited

U.S. PATENT DOCUMENTS

| | | | |
|---|---|---|---|
| 3,838,102 | 9/1974 | Bennett et al. | 528/486 |
| 4,237,265 | 12/1980 | Eliassen et al. | 528/486 |
| 4,965,324 | 10/1990 | Bertram et al. | 528/499 |

Primary Examiner—John Kight, III
Assistant Examiner—T. Mosley
Attorney, Agent, or Firm—Foley & Lardner

[57] ABSTRACT

The invention relates to a process for the preparation of novolak resins having a low amount of metal ions. In the process, a conventional resin in an organic solution is brought into contact with an acidic, preferably complex-forming compound which preferably is present in an aqueous phase. The resin solutions may be used in the production of photoresists.

25 Claims, No Drawings

PROCESS FOR THE PREPARATION OF NOVOLAK RESINS WITH LOW METAL ION CONTENT

BACKGROUND OF THE INVENTION

The present invention relates to a process for the preparation of novolak resins having a low content of metal ions.

The quality of photoresists can be improved by substantially reducing the amount of contaminating metal ions in the photoresists. Impurities included in photoresists mostly comprise metal ions, in particular ions of iron, sodium, barium, calcium, magnesium, copper and manganese. These impurities are attributable to a resin component which is present as a binder in the photosensitive compositions. The resin component preferably is a novolak resin which typically comprises condensation products of phenols or cresols with formaldehyde. The contaminating metal ions get into the resins primarily as a result of the preparation process. The free phenolic OH groups in the novolak resin promote the incorporation of metal ions by proton exchange and by complexing on the polar groups.

Due to this complex formation, only a minor purifying effect is achieved when the impurities included in the resin dissolved in an organic solvent are washed out with water. The expenditure for separating metal ions is increased by the low amount of only a few ppm of metal ions in the resin solutions used for the preparation of photoresists. To evaluate the quality of the purified products it is sufficient to determine the amount of iron and sodium present which serve as indicator metal cations for measuring the purifying effect.

Separation by volatilization such as, for example, by evaporation of the metal ions or the resin, is impracticable. Similarly, thermal purification processes cannot be used for novolak resins in a molten state, since the resins have a high viscosity and are instable chemically when they are heated relatively strongly. Only after dissolving in an organic solvent can the resins be subjected to a purifying operation. Precipitation processes are excluded because a precipitate of the sparingly soluble metal salts cannot be attained with the extremely low concentrations of metal ions present. Adsorption processes fail due to an insufficient selectivity of the adsorbents with respect to traces of metal ions in the organic medium. Prior to the present invention an adequate purification technique for the removal of metal traces from novolak resins had not been described and thus there is a need to solve this separation problem brought about by recent technological developments in the field of microelectronics.

SUMMARY OF THE INVENTION

It is therefore an object of the present invention to provide a process for the preparation of a novolak resin having a low amount of metal ions, by means of which process the initial concentration of a few ppm of metal ions is reduced further.

It is also an object of the present invention to provide a novolak resin having a substantially reduced amount of metal ions.

A further object of the present invention is to provide a photoresist having a low amount of contaminating metal ions.

In accomplishing the foregoing objects there is provided according to the present invention a process comprising the steps of dissolving a conventional novolak resin in an organic solvent or solvent mixture in a concentration of about 25 to 50 percent, preferably 30 percent, by weight and then contacting the resultant solution at least once with an acidic, preferably complex-forming, compound. Preferably, the contacting step is performed by carrying out a liquid-liquid extraction which may include a single-stage, multi-stage cross-flow or multi-stage countercurrent treatment.

There also is provided according to the present process a novolak resin having a reduced amount of metal ions.

Furthermore, there is provided according to the present process a photoresist having a base and at least one photosensitive layer including a binder, wherein the binder comprises a novolak resin having a low amount of contaminating metal ions.

Further objects, features and advantages of the present invention will become apparent from the detailed description of preferred embodiments that follows.

DETAILED DESCRIPTION OF PREFERRED EMBODIMENTS

According to the present invention, a conventional novolak resin is dissolved in an organic solvent or solvent mixture in a concentration of about 25 to 50 percent by weight, preferably about 30 percent by weight, and the metal ion content of the resin is reduced by bringing the resin once or repeatedly in contact with an acidic, preferably complex-forming, compound. Preferably, the acidic complex-forming compound is dissolved in water in a concentration of about 0.01 to 20 percent by weight. Contact can be made by bringing together liquid and solid phases. Preferably, contact is effected in the form of a liquid-liquid extraction.

Contact preferably is obtained in a single-stage or multi-stage cross-flow or countercurrent treatment, cross-flow being advantageous due to its intensity.

The phase volume ratio of organic solvent phase (0) to aqueous extracting agent (W) is about (1 to 5):1, preferably (2.5 to 3):1.

Through the utilization of the present process, the metal ion content can be reduced by two to three decimal places and, as a result, materials can be prepared which meet the stringent requirements in microelectronics.

Accordingly, novolak resins can be prepared by the present process, which have an amount of sodium ions and iron ions as indicator metal cations under about 1 ppm and under about 0,5 ppm, respectively. Preferably, the novolak resins have an amount of sodium ions and iron ions under about 0,5 ppm and under about 0,05 ppm, respectively. Particularly preferably, the amounts of sodium ions and iron ions are under about 0,2 ppm and 0,02 ppm, respectively.

It has been discovered that most metal ions can be separated to an extremely high degree from solutions of novolak resins in organic water-insoluble solvents if these organic solutions are extracted with aqueous solutions which include inorganic or organic acids, in particular acids having complexing properties. Preferable inorganic acids comprise mineral acids, especially hydrochloric acid, sulfuric acid or phosphoric acid. In addition, hydrocyanic acid used in low concentrations produces a purifying effect due to its complexing behavior. Preferably, organic acids employed in the present invention are soluble in water and, if desired, usable in extremely small amounts. Preferred organic acids include low-molecular weight carboxylic acids, such as formic acid, acetic acid, propionic acid and butyric acid. More preferred are the polyfunctional acids which have, in additional polar groups, active hydrogen or electron donors, such as carboxyl, hydroxyl, oxo, amino or ester groups and thus have enhanced complexing properties. Such acids include, in particular, dicarboxylic acids, for example, oxalic acid, malonic acid, succinic acid or, as an unsaturated acid, maleic acid.

A similar complexing action is also exhibited by ketocarboxylic acids or hydroxycarboxylic acids such as, for example, glycolic acid and lactic acid or, of the aromatic compounds, salicylic acid. In addition, the oxidation products of polyhydric alcohols are particularly effective, for example, tartaric acid which shows a good complexing action, citric acid, mesoxalic acid or l-ascorbic acid. Another particularly preferable class of compounds includes the acidic chelating agents used in complexometry, for example, nitrilo-triacetic acid, ethylene-dinitrilo-tetraaceticacid, 1,2-cyclohexylene-dinitrilo-tetraaceticacid, diethylene-triamine-pentaacetic acid and 3,6-dioxaoctamethylenedinitrilotetraacetic acid, which are commercially available as Titriplex® (Manufacturer Merck, Fed. Republic of Germany). Additional extracting agents for metal ions include acidic esters of phosphoric acid, phosphonic acid and phosphinic acid.

Taking into account the practicability of the process according to the present invention, the acidic, preferably complex-forming, compound used preferably comprises an organic compound which has at least one active hydrogen atom and is capable of forming further valence bonds with other active hydrogen atoms or polar moieties. Compounds of this kind include low-molecular weight carboxylic acids which have complex-forming substituents, such as carboxyl, hydroxyl, oxo, amino or ester groups in their molecules, in particular formic acid, acetic acid, oxalic acid, malonic acid, glycolic acid, lactic acid, tartaric acid and citric acid. Oxalic acid and malonic acid particularly are preferred.

In recent years, a number of complexing or chelating agents having selective properties with respect to particular metal ions have been developed for use in hydrometallurgical extraction and purification processes. The active (acidic) hydrogen of these agents can be replaced by metal ions. Furthermore, there are secondary valence bonds with other radicals carrying electron donors, which have N, P and O atoms in their molecules. These include, for example, hydroximes, oxime derivatives, β-diketones and the dioximes of α-diketones. The long-chain extracting agents which were developed for separating metal ions from aqueous solutions are insoluble in water to meet the requirements of their hydrometallurgical application. The short-chain extracting agents, on the other hand, which are inappropriate for hydrometallurgical use, e.g., dimethylglyoxime and acetylacetone, show a certain water solubility and consequently can be used for the purification of resins according to the process of the present invention.

Apart from the acidic extracting agents which are dissolved in water, solid cation exchanger resins with acidic functional groups (-SO₃H, -COOH) also produce a certain, although less pronounced, purifying effect. If such a solid ion exchanger resin is used, particular care must be taken to prevent the resin from being partly swollen or dissolved by the organic solvent of the novolak resin.

To prepare liquid phases of the novolak resins, which are required for the purification process, any solvents can be used in which these resins are soluble. Polar solvents are preferred, for example, relatively high-molecular weight ketones, such as methylisobutylketone, glycol derivatives having ester or ether groups, carboxylic acid esters, relatively high-molecular weight alcohols and mixtures of various solvents. The resin content in the solution is in the range from about 25 to 50 percent by weight and is preferably about 30 percent by weight.

It is sufficient for the aqueous solutions of the extracting agents to include less than about 20 percent by weight, preferably between about 0.05 to 3 percent by weight, of the extracting agents. Some extracting agents which have a limited solubility in water, are included in the aqueous solution in a quantity ranging from about 100 to 1,000 ppm.

Extraction can be carried out in one stage by mixing once or by mixing repeatedly (multi-stage), each time with a fresh solution of the extracting agent (cross-flow extraction) or by multi-stage countercurrent extraction. Although room temperature is preferred it is also possible to run the extraction process at other temperatures, provided the resin is not impaired.

After extraction and phase separation, the fractions of water which are dissolved in the organic phase can be removed without difficulty by vacuum distillation.

The novolak resin solutions so treated can be directly used for the preparation of binders for photoresist compositions.

The following examples are given to explain the process of the invention in further detail with regard to the modified sodium and iron contents of the resin solution.

EXAMPLES

1. The starting solution used is a resin solution comprising 30 percent by weight of novolak resin (termed "resin" in the following examples) in an organic solvent mixture comprised of ethylglycol acetate, n-butyl acetate and xylene (termed "EBX solvent" in the following examples). This organic solution is contaminated with 2.8 ppm of sodium ions and 1.3 ppm of iron ions. To separate the metal ions, the organic resin solution (O) is subjected, at room temperature, to a single-stage extractive mixing with an aqueous solution (W) containing the extracting agent in distilled water, at a phase volume ratio O:W of 3:1. The results of the extractive treatments using various inorganic acids as the extracting agent are compiled in Table 1. For comparison, Table 1 also shows the results of an extraction under identical conditions, but using pure distilled water.

To determine the amount of sodium in the resin solutions a conventional flame atomic absorption is carried out. For this purpose, the samples are diluted with propylene-glycol monomethylether acetate and measured by direct measurement against standards of known concentration.

For the determination of the amount of iron the samples are diluted with the same solvent and subjected to graphite furnace atomic absorption and Zeeman background compensation. Also in this case standards of known concentration are measured at the same time for comparison.

TABLE 1

| Extracting Agent in Water | Wt. % | Na content ppm | Organic Solvent Phase degree of extraction % | Fe content ppm | degree of extraction % |
|---|---|---|---|---|---|
| Sulfuric acid | 1.0 | 0.10 | 96.4 | 0.02 | 98.5 |
| Hydrochloric acid | 1.0 | 0.09 | 96.8 | 0.02 | 98.5 |
| Phosphoric acid | 1.0 | 0.20 | 92.8 | 0.02 | 98.5 |
| Hydrocyanic acid | 0.05 | 0.40 | 85.7 | 0.20 | 84.6 |
| Pure Distilled Water | | 2.3 | 17.9 | 1.0 | 23.0 |

2. The starting solution used is the same resin solution as in Example 1 showing the same degree of contamination. Extractive purification is carried out under the same conditions as specified in Example 1, but using organic extracting agents in the aqueous phase. The results are compiled in Table 2.

TABLE 2

| Extracting Agent in Water | Wt. % | Na content ppm | Organic Solvent Phase degree of extraction % | Fe content ppm | degree of extraction % |
|---|---|---|---|---|---|
| Formic acid | 1.0 | 0.07 | 97.5 | 0.04 | 96.9 |
| Acetic acid | 1.0 | 0.13 | 95.4 | 0.09 | 93.1 |
| Glycolic acid | 1.0 | 0.05 | 98.2 | 0.03 | 97.7 |
| Lactic acid | 1.0 | 0.11 | 96.1 | 0.03 | 97.7 |
| Oxalic acid | 1.0 | 0.05 | 98.2 | 0.004 | 99.7 |
| Malonic acid | 1.0 | 0.09 | 96.8 | 0.02 | 98.5 |
| Succinic acid | 1.0 | 0.10 | 96.4 | 0.05 | 96.2 |
| l-(+) Tartaric acid | 1.0 | 0.20 | 92.9 | 0.02 | 98.5 |
| Citric acid | 1.0 | 0.17 | 93.9 | 0.02 | 98.5 |
| l-Ascorbic acid | 1.0 | 0.23 | 91.8 | 0.02 | 98.5 |
| Salicylic acid | 1.0 | 0.34 | 87.9 | 0.08 | 93.8 |
| Vinylphosphonic acid | 1.0 | 0.11 | 96.1 | 0.005 | 99.6 |

3. The resin solution (O) of Examples 1 and 2 is used as the starting solution. The extracting agent is now an aqueous solution (W) containing organic chelating agents. Extraction is carried out in two stages according to the cross-flow process, in each case at a phase volume ratio O:W of 2.4:1 and at room temperature. The results are compiled in Table 3.

TABLE 3

| Extracting Agent in Water | Wt. % | Na content ppm | Organic Solvent Phase degree of extraction % | Fe content ppm | degree of extraction % |
|---|---|---|---|---|---|
| Nitrilotriacetic acid | 0.09 | 0.10 | 96.4 | 0.02 | 98.5 |
| Ethylenedinitrilotetraacetic acid | 0.12 | 0.16 | 94.3 | 0.12 | 90.8 |
| 1,2-Cyclohexylenedinitrilotetraacetic acid | 0.023 | 0.13 | 95.4 | 0.04 | 96.9 |
| 3,6-Dioxaoctamethylenedinitrilotetraacetic acid | 0.033 | 0.14 | 95.0 | 0.07 | 94.6 |

4. The starting solution used is a 30% concentration novolak resin solution in propyleneglycol monomethylether acetate, containing 2.6 ppm of iron ions and 4.2 ppm of sodium ions. Extraction is carried out with aqueous solutions containing oxalic acid or acetylacetone or dimethylglyoxime. The results are compiled in Table 4.

TABLE 4

| Extracting Agent in Water | Wt. % | Na content ppm | Organic Solvent Phase degree of extraction % | Fe content ppm | degree of extraction % |
|---|---|---|---|---|---|
| Oxalic acid | 1 | 0.12 | 97.1 | 0.012 | 99.5 |
| Acetylacetone | 1 | 0.16 | 96.2 | 2.1 | 19.2 |
| Dimethylglyoxime | 0.04 | 0.5 | 88.1 | 0.3 | 88.5 |

5. The starting solution (O) is a solution of 30% of novolak resin in methylisobutylketone containing 5.1 ppm of sodium ions and 3.7 ppm of iron ions. The extracting agents comprise aqueous solutions (W) containing 1% by weight or 15% by weight of oxalic acid. Extraction is carried out in one stage at room temperature and at a phase volume ratio O:W of 3:1. The results are given in Table 5.

TABLE 5

| Extracting Agent in Water | Wt. % | Na content ppm | Organic Solvent Phase degree of extraction % | Fe content ppm | degree of extraction % |
|---|---|---|---|---|---|
| Oxalic acid | 1 | 0.08 | 98.4 | 0.02 | 99.5 |
| Oxalic acid | 15 | 0.05 | 99.0 | 0.01 | 99.7 |

6. The purifying action of solid ion exchangers is determined by means of the following 30% by weight concentration novolak resin solutions:

Solution A with EBX solvent contains 2.8 ppm of sodium ions and 1.3 ppm of iron ions.
Solution B with propyleneglycol monomethylether acetate contains 4.1 ppm of sodium ions and 3.1 ppm of iron ions.

The ion exchanger is stirred into the resin solution at room temperature and equilibrium is established with stirring. The results are compiled in Table 6.

TABLE 6

| Starting Material resin solution ml | ion exchanger | g | Na content ppm | Organic Raffinate reduction % | Fe content ppm | reduction % |
|---|---|---|---|---|---|---|
| 120 A | Amberlyst ® | 3 | 0.5 | 82.1 | 1.3 | 0 |
| 120 A | Nafion ® | 2 | 0.8 | 71.4 | 1.3 | 0 |
| 120 A | Lewatit ® | 3 | 0.6 | 78.6 | 0.9 | 30.8 |
| 120 A | Lewatit ® | 3 | 0.8 | 71.4 | 0.8 | 38.5 |
| 120 A | Lewatit ® | 3 | 0.7 | 75.0 | 0.8 | 38.5 |
| 120 B | Amberlyst ® | 3 | 0.7 | 83.0 | 3.0 | 3.2 |
| 120 B | Lewatit ® | 3 | 0.9 | 78.0 | 1.7 | 45.2 |

Amberlyst ®, manufacturer Rohm + Haas, U.S.A.
Nafion ®, manufacturer DuPont, U.S.A.
Lewatit ®, manufacturer Bayer AG, Fed. Republic of Germany

What is claimed is:

1. A process for the preparation of novolak resins having a reduced amount of metal ions, comprising the steps of:
    (a) dissolving a conventional novolak resin in an organic solvent or solvent mixture in a concentration of about 25 to 50 percent by weight and then
    (b) contacting the resultant solution at least once with an acidic compound.

2. A process as recited in claim 1, wherein the acidic compound comprises a complex-forming compound.

3. A process as recited in claim 1, wherein the acidic compound is dissolved in water in a concentration of about 0.01 to 20 percent by weight.

4. A process as recited in claim 1, wherein step (b) comprises carrying out a liquid-liquid extraction.

5. A process as recited in claim 4, wherein the extraction comprises a single-stage treatment.

6. A process as recited in claim 4, wherein the extraction comprises a multi-stage cross-flow treatment.

7. A process as recited in claim 4, wherein the extraction comprises a multi-stage countercurrent treatment.

8. A process as recited in claim 1, wherein step (a) comprises dissolving the novolak resin solution in a concentration of about 30 percent by weight.

9. A process as recited in claim 3, wherein the acidic compound is dissolved in water in a concentration of about 0.05 to 3 percent by weight.

10. A process as recited in claim I, wherein the acidic compound comprises an organic compound having at least one active hydrogen atom and the ability to form valence bonds with other active hydrogen atoms or polar moieties.

11. A process as recited in claim 10, wherein the organic compound comprises a low-molecular weight carboxylic acid having at least one complex-forming substituent selected from the group consisting of a carboxyl, a hydroxyl, an oxo, an amino and an ester group.

12. A process as recited in claim 11, wherein the organic compound comprises a substance selected from the group consisting of formic acid, acetic acid, oxalic acid, malonic acid, glycolic acid, lactic acid, tartaric acid and citric acid.

13. A process as recited in claim 1, wherein the acidic compound comprises an inorganic compound selected from the group consisting of sulfuric acid, hydrochloric acid, phosphoric acid and hydrocyanic acid.

14. A process as recited in claim 1, wherein the acidic compound comprises a chelating agent selected from the group consisting of nitrilotriacetic acid, ethylene-dinitrilo-tetraacetic acid, 1,2-cyclohexylene-dinitrilo-tetraacetic acid and 3,6-dioxaoctamethylene-dinitrilo-tetraacetic acid.

15. A process as recited in claim 1, wherein the acidic compound comprises an extracting agent selected from the group consisting of acetylacetone and dimethylglyoxime.

16. A process as recited in claim 3, wherein the volume ratio of the resin/organic solvent solution to the aqueous acidic compound solution is from about 1:1 to 5:1 during step (b).

17. A process as recited in claim 16, wherein the volume ratio of the resin/organic solvent solution to the aqueous acidic compound solution is from about 2.5:1 to 3:1 during step (b).

18. A novolak resin having a reduced amount of metal ions produced by the process according to claim 1.

19. A novolak resin as recited in claim 18 comprising a total amount of sodium ions and iron ions as indicator metal cations under about 1 ppm and under about 0.5 ppm, respectively.

20. A novolak resin as recited in claim 18 comprising a total amount of sodium ions and iron ions as indicator metal cations under about 0.5 ppm and under about 0.05 ppm, respectively.

21. A novolak resin as recited in claim 18 comprising a total amount of sodium ions and iron ions as indicator metal cations under about 0.2 ppm and under 0.02 ppm, respectively.

22. A photoresist having a base and at least one photosensitive layer including a binder, wherein the binder comprises a novolak resin according to claim 18.

23. A photoresist according to claim 22, wherein said novolak resin includes a total amount of sodium ions and iron ions as indicator metal cations under about 1 ppm and under about 0.5 ppm, respectively.

24. A photoresist according to claim 22, wherein said novolak resin includes a total amount of sodium ions and iron ions as indicator metal cations under about 0.5 ppm and under about 0.05 ppm, respectively.

25. A photoresist according to claim 22, wherein said novolak resin includes a total amount of sodium ions and iron ions as indicator metal cations under about 0.2 ppm and under about 0.02 ppm, respectively.

* * * * *